(12) United States Patent
Strege et al.

(10) Patent No.: US 8,247,632 B2
(45) Date of Patent: *Aug. 21, 2012

(54) PROCESS FOR THE CONVERSION OF RENEWABLE OILS TO LIQUID TRANSPORTATION FUELS

(75) Inventors: Joshua R. Strege, Grand Forks, ND (US); Benjamin G. Oster, Thompson, ND (US); Paul D. Pansegrau, Grand Forks, ND (US); Chad A. Wocken, Grand Forks, ND (US); Ted R. Aulich, Grand Forks, ND (US); Marc Kurz, Thompson, ND (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 69 days.

This patent is subject to a terminal disclaimer.

(21) Appl. No.: 12/493,193

(22) Filed: Jun. 27, 2009

(65) Prior Publication Data

US 2012/0157733 A1  Jun. 21, 2012

Related U.S. Application Data

(63) Continuation-in-part of application No. 12/264,689, filed on Nov. 4, 2008.

(51) Int. Cl.
*C07C 1/00* (2006.01)
(52) U.S. Cl. .............. 585/733; 585/240; 44/306; 44/605
(58) Field of Classification Search .................... 585/240, 585/733; 44/306, 605
See application file for complete search history.

(56) References Cited

U.S. PATENT DOCUMENTS 4,992,605 A * 2/1991 Craig et al. ................... 585/240

(Continued)

FOREIGN PATENT DOCUMENTS

CA   2149685   9/1999

(Continued)

OTHER PUBLICATIONS

Kalnes, Tom; Marker, Terry; and Shonnard, David R. (2007) "Green Diesel: A Second Generation Biofuel," International Journal of Chemical Reactor Engineering: vol. 5: A48; http://www.bepress.com/ijcre/vol5/A48.

*Primary Examiner* — Robert J Hill, Jr.
*Assistant Examiner* — Brian McCaig
(74) *Attorney, Agent, or Firm* — Schwegman, Lundberg & Woessner, P.A.

(57) ABSTRACT

A method of producing a hydrocarbon product by hydrotreating a feedstock comprising triacylglyceride (TAG) and TAG-derived materials such as free fatty acid (FFA) and fatty acid methyl ester (FAME) in the presence of a nonsulfided hydrotreating catalyst to produce a first product comprising hydrocarbons. A method of producing a transportation fuel by selecting an undoped feedstock comprising virgin TAG, used TAG, FFA, and FAME or a combination thereof; hydrotreating the undoped feedstock in the presence of an unsulfided hydrotreating catalyst to produce a first product and subjecting the first product to at least one process selected from aromatization, cyclization, and isomerization to produce a second hydrocarbon product selected from gasoline, kerosene, jet fuel, and diesel fuels. A method is described by which fatty acids may be converted to hydrocarbons suitable for use as liquid transportation fuels. Additionally, the method allows for the blending of fatty acids with TAGs, and the conversion of such blends to hydrocarbons suitable for use as liquid transportation fuels. The method utilizes a catalyst and hydrogen as reductant to convert fatty acids to hydrocarbons. Subsequent steps, including dewatering, isomerization, and distillation, can provide a hydrocarbon mixture useful as a liquid transportation fuel or as a blendstock with petroleum transportation fuels.

23 Claims, 4 Drawing Sheets

Table 1. Compositions of Fatty Acid Mixtures Converted to Hydrocarbons

| Fatty Acid | Sample 1, % composition | Sample 2, % composition |
|---|---|---|
| C16:0 | 10.4 | 21.0 |
| C16:1 | – | 10.3 |
| C18:0 | 3.6 | 6.9 |
| C18:1 | 25.3 | 39.9 |
| C18:2 | 54.8 | 19.0 |
| C18:3 | 5.1 | – |
| C20:0 | 0.7 | 0.1 |
| C20:1 | – | 0.5 |
| Others | 0.1 | 0.3 |

U.S. PATENT DOCUMENTS

| | | |
|---|---|---|
| 5,705,722 A | 1/1998 | Monnier et al. |
| 2006/0161032 A1* | 7/2006 | Murzin et al. ................. 585/240 |
| 2006/0207166 A1* | 9/2006 | Herskowitz et al. ............ 44/385 |
| 2007/0010682 A1 | 1/2007 | Myllyoja et al. |
| 2007/0175795 A1* | 8/2007 | Yao et al. ...................... 208/142 |
| 2008/0071125 A1* | 3/2008 | Li ................................. 585/361 |
| 2009/0069610 A1* | 3/2009 | Roberts et al. .................. 585/24 |

FOREIGN PATENT DOCUMENTS

| | | |
|---|---|---|
| EP | 1396531 | 10/2004 |
| WO | WO2004022674 | 3/2004 |
| WO | WO2006075057 | 7/2006 |
| WO | WO2007003709 | 1/2007 |

* cited by examiner

Table 1. Compositions of Fatty Acid Mixtures Converted to Hydrocarbons

| Fatty Acid | Sample 1, % composition | Sample 2, % composition |
| --- | --- | --- |
| C16:0 | 10.4 | 21.0 |
| C16:1 | – | 10.3 |
| C18:0 | 3.6 | 6.9 |
| C18:1 | 25.3 | 39.9 |
| C18:2 | 54.8 | 19.0 |
| C18:3 | 5.1 | – |
| C20:0 | 0.7 | 0.1 |
| C20:1 | – | 0.5 |
| Others | 0.1 | 0.3 |

FIG. 1

Table 2. Typical Hydrocarbon Distribution from Processing of Soy Fatty Acid

| Carbon Number | % n-Paraffin | % i-Paraffin | % c-Paraffin | % Olefin |
|---|---|---|---|---|
| 18 | 35.75 | 8.2 | – | 1.89 |
| 17 | 10.34 | 2.4 | – | 1.04 |
| 16 | 14.28 | 0.83 | – | – |
| 15 | 3.95 | 0.36 | – | – |
| 14 | 1.56 | 0.14 | 0.02 | – |
| 13 | 1.23 | 0.22 | – | – |
| 12 | 1.26 | 0.26 | – | 0.08 |
| 11 | 1.18 | 0.26 | – | – |
| 10 | 1.20 | 0.24 | 0.02 | 0.08 |
| 9 | 1.05 | 0.23 | 0.04 | – |
| 8 | 1.16 | 0.31 | 0.07 | – |
| 7 | 1.15 | 1.04 | 0.18 | – |
| 6 | 0.97 | 0.24 | 0.27 | 0.06 |
| 5 | 0.67 | 0.09 | 0.15 | – |
| 4 | 0.31 | – | – | – |
| 3 | 0.07 | – | – | – |
| Totals | 76.13 | 14.82 | 0.75 | 3.15 |

FIG. 2

Table 3. Distribution of Products from Dewatering, Deacidification, and Isomerization Steps

| Carbon Number | % n-Paraffin | % i-Paraffin | % c-Paraffin | % Olefin |
|---|---|---|---|---|
| 18 | 0.22 | 4.09 | – | – |
| 17 | 1.06 | 10.91 | – | – |
| 16 | 3.25 | 8.10 | – | – |
| 15 | 1.74 | 4.68 | – | – |
| 14 | 1.05 | 2.86 | – | – |
| 13 | 1.24 | 5.44 | – | – |
| 12 | 1.40 | 6.08 | – | – |
| 11 | 1.53 | 5.77 | 0.29 | – |
| 10 | 1.67 | 6.29 | 0.46 | – |
| 9 | 1.72 | 6.03 | 0.85 | – |
| 8 | 2.02 | 4.33 | 0.94 | – |
| 7 | 1.95 | 3.45 | 1.25 | – |
| 6 | 1.55 | 2.42 | 0.54 | – |
| 5 | – | 2.25 | – | – |
| 4 | – | 0.59 | – | – |
| 3 | – | – | – | – |
| Totals | 20.40 | 73.29 | 4.33 | – |

FIG. 3

Table 4. Results from First Test Matrix

| Example | Oil Flow, lb/hr | Temp., °C | Pressure, psig | H$_2$ Flow, scfh | Saturated Hydrocarbons, % | Olefinic Hydrocarbons, % | Fatty Acids, % |
|---|---|---|---|---|---|---|---|
| 1 | 1 | 340 | 80 | 20 | 43.8 | 27.4 | 19.0 |
| 2 | 1 | 350 | 100 | 20 | 27.2 | 33.9 | 26.9 |
| 3 | 2 | 350 | 100 | 40 | 21.8 | 26.1 | 40.0 |
| 4 | 1 | 350 | 200 | 20 | 50.4 | 18.0 | 16.0 |
| 5 | 2 | 350 | 200 | 40 | 27.3 | 20.0 | 41.9 |
| 6 | 1 | 400 | 100 | 20 | 40.6 | 37.0 | 7.4 |
| 7 | 2 | 400 | 100 | 40 | 37.7 | 32.3 | 16.9 |
| 8 | 1 | 400 | 200 | 20 | 73.5 | 10.5 | 3.2 |
| 9 | 2 | 400 | 200 | 50 | 63.3 | 13.8 | 2.2 |

FIG. 4

Table 5. Results from Yellow Grease as Feedstock

| Example | Oil Flow, mL/min | Temp., °C | Pressure, psig | H$_2$ Flow, sccm | Saturated Hydrocarbons, % | Aromatic Hydrocarbons, % | Olefinic Hydrocarbons, % |
|---|---|---|---|---|---|---|---|
| 10 | 1.0 | 474 | 750 | 1064 | 90 | 9 | 0 |
| 11 | 1.0 | 480 | 750 | 1050 | 77 | 17 | 3 |
| 12 | 1.0 | 490 | 750 | 1050 | 64 | 32 | 1 |
| 13 | 1.0 | 502 | 750 | 1050 | 56 | 39 | 2 |
| 14 | 1.0 | 530 | 750 | 1050 | 37 | 60 | 1 |
| 15 | 1.5 | 498 | 750 | 1050 | 91 | 7 | 2 |
| 16 | 4.5 | 482 | 750 | 1066 | 63 | 7 | 21 |
| 17 | 4.5 | 487 | 750 | 1088 | 62 | 13 | 23 |

FIG. 5

PROCESS FOR THE CONVERSION OF RENEWABLE OILS TO LIQUID TRANSPORTATION FUELS

CROSS REFERENCE TO RELATED APPLICATIONS

This application is a continuation in part of U.S. patent application Ser. No. 12/264,689, filed on Nov. 4, 2008, entitled "PROCESS FOR THE CONVERSION OF RENEWABLE OILS TO LIQUID TRANSPORTATION FUELS" (pending), the disclosure of which is herein incorporated by reference.

STATEMENT REGARDING FEDERALLY SPONSORED RESEARCH OR DEVELOPMENT

This invention was made with U.S. government support under Cooperative Agreement No. W9132T-08-2-0014 awarded by the U.S. Army Construction Engineering Research Laboratory. The Government has certain rights in this invention.

BACKGROUND

1. Field of the Invention

The invention relates to a method for the conversion of renewable fats and oils (triacylglycerides, or TAGs) to hydrocarbons. The invention also accommodates the production of renewable fuels from either fatty acid methyl ester (FAME) or free fatty acids (FFAs). The fatty acids, for instance, may be derived from TAGs via hydrolysis by a number of methods, including steam hydrolysis. The oils may be derived from plants, animals, or algae, or mixtures thereof. The method is applicable to the manufacture of liquid transportation fuels, for example, especially gasoline, naphtha, kerosene, jet, and diesel fuels. The method is also applicable to the manufacture of other hydrocarbons.

2. Background of the Invention

Increasing costs for petroleum-derived fuels are driving interest in alternative feedstocks. Additionally, concern over increasing atmospheric carbon dioxide levels has spawned interest in "carbon-neutral" fuels. One possible solution to both of these issues is the utilization of TAG feedstocks for the production of hydrocarbon-based transportation fuels.

Certain TAGs are already utilized as feedstocks for the production of "biodiesel." In this process, the TAG is transesterified with methanol to provide a FAME and glycerine. The FAME is separated, purified, and sold as an additive, supplementing petroleum-derived diesel fuel. FAME diesel additives provide certain specific benefits to their use (i.e., lubricity), but suffer serious physical limitations when used as the sole fuel and not as a blendstock (i.e., cold-flow properties).

FAME diesel fuel represents a first-generation bio-derived fuel. The shortcomings of this generation of fuel are directly related to the fuel-possessing oxygen functionality. A second-generation fuel possesses no oxygen functionality, providing a more petroleumlike product with respect to elemental composition, and is oftentimes termed "renewable diesel."

Recent publications and patents have described the conversion of TAG to hydrocarbon fuels via technology oftentimes referred to as "hydrodeoxygenation." This technology converts the fatty acid portion of a TAG to a normal hydrocarbon either of a carbon number equal to the original fatty acid or to a hydrocarbon possessing one carbon less than the original fatty acid. The glycerine portion of the TAG is most often converted to propane or otherwise lost within the process.

The glycerine portion of the TAG possesses economic value in itself greater than that of propane and, as such, could be an important economic by-product from an overall process that would provide glycerine as a by-product.

Certain patents list strategies for limiting the acidity of the fuel that is produced. This can include recycle of the product with fresh feedstock over the catalyst bed and limiting the total acidity of the product introduced to the catalyst.

A major difference between fatty acid and TAG is the nature of the acid functionality present in each compound. For the TAG, the acid is present as an ester functionality. For the fatty acid, the acid is present as a carboxylic acid. It is well established that ester functionality is more easily reduced to saturated hydrocarbon via hydrogenation technology than is the carboxylic acid functionality. This limits the amount of fatty acid that may be present in the feedstock and feedstock blends.

One method describes the conversion of depitched tall oil to a diesel fuel additive (see generally Canadian Patent 2,149,685). The method describes a hydrodeoxygenation process utilizing a hydrotreating catalyst. The catalyst is prepared by presulfiding. The sulfided nature of the catalyst may be maintained by adding sulfur to the tall oil feedstock at a level of 1000 ppm. The doping agent is carbon disulfide. The hydrodeoxygenation conversion is then performed at 410° C. and 1200 psi.

Another method describes the preparation of a diesel fuel from a vegetable TAG oil (see generally U.S. Patent Application 2007/0010682). The TAG oil is doped with 50 to 20,000 ppm sulfur. The hydrodeoxygenation step is performed between 580 and 725 psi and 305° and 360° C.

Accordingly, there is a need for a method of producing paraffinic hydrocarbons from a feedstock comprising TAGs without the need for presulfiding the hydrotreating catalyst or doping the feedstock with sulfur. There is a need for a hydrotreating process where the resulting hydrocarbon chain lengths are distributed similarly to those in conventional petroleum-derived fuels. Additionally, there is a need for a method that is tailored to the efficient reduction of fatty acid to hydrocarbon, with no limitation to the amount of fatty acid that may be present in the feedstock blend.

SUMMARY

Herein disclosed is a method of producing a hydrocarbon product, for example, by hydrotreating a feedstock comprising TAG in the presence of a nonsulfided hydrotreating catalyst to produce a first product comprising hydrocarbons. In one example, the feedstock comprising TAG may be selected from the group consisting of yellow grease, brown grease, virgin TAG, and combinations thereof. Additionally, the TAG may be sourced from either industrial or waste merchants. The method may also utilize FFA as feedstock. The method may further utilize FAME as a feedstock. The method may yet further comprise selecting a feedstock comprising a ratio of virgin TAG to used TAG such that the first product has a desired composition of hydrocarbons. Additionally, the method may comprise selecting a feedstock comprising a ratio of either virgin TAG or used TAG to FFA such that the first product has a desired composition of hydrocarbons. Hydrotreating may provide a hydrocarbon product possessing both even- and odd-numbered carbon chains. Hydrotreating may comprise reduction, decarboxylation, decarbonylation, and other reactions.

In one example, a nonsulfided hydrotreating catalyst comprises at least one metal selected from Groups VIII and VIB of the Periodic Table. In some examples, the hydrotreating catalyst comprises at least one metal selected from the group consisting of palladium (Pd), platinum (Pt), nickel (Ni), and combinations thereof. In one example, the hydrotreating catalyst may comprise nickel and molybdenum (Mo) or cobalt (Co) and molybdenum. In some examples, the hydrotreating catalyst further comprises a support selected from alumina, silica, and combinations thereof. In some examples, the feedstock is not doped with sulfur prior to hydrotreating.

In one example, hydrotreating may be performed at a temperature in the range of about 340° to about 450° C. and a pressure in the range of about 500 psig to about 700 psig. The first product may comprise at least 50% normal alkanes. In some applications, the first product comprises at least 70% normal alkanes. The first product may further comprise up to 10% normal alkenes.

In some examples, the method may further comprise subjecting the first product to at least one process selected from isomerization, cyclization, and aromatization to produce a fuel selected from the group consisting of gasoline, kerosene, jet, and diesel fuels.

In some embodiments, hydrotreating is performed at a temperature in the range of about 470° to about 530° C. and a pressure in the range of about 500 psig to about 1000 psig. The first product may comprise primarily saturated and aromatic hydrocarbons. The first product may be suitable as a liquid transportation fuel with minimal or no secondary petroleum-refining and processing operations. In some examples, the first product further comprises olefinic hydrocarbons, and the ratio of the saturated hydrocarbons to the aromatic hydrocarbons to the olefinic hydrocarbons in the first product may be varied so as to produce feedstocks ideally suited for the production of at least one fuel selected from gasoline, kerosene, jet, and diesel fuels.

Also disclosed is a method of producing a transportation fuel, an example of the method comprising selecting an undoped feedstock comprising virgin TAG, used TAG, FFA, or FAME or a combination thereof; hydrotreating the undoped feedstock in the presence of an unsulfided hydrotreating catalyst to produce a first product; and subjecting the first product to at least one process selected from aromatization, cyclization, and isomerization to produce a second hydrocarbon product selected from gasoline, kerosene, jet, and diesel fuels. The first product may comprise aromatic, saturated, and olefinic hydrocarbons, and the composition of the feedstock may be selected such that the ratio of saturated to aromatic to olefinic hydrocarbons in the first product is suitable for the production of the second hydrocarbon product. Hydrotreating may be performed in the absence of sulfur injection into the process or the feedstock.

Also disclosed is a method that is tailored to the efficient reduction, decarboxylation, and decarbonylation of fatty acid to hydrocarbon. There is no limitation to the amount of fatty acid that may be present in the feedstock blend. In fact, mixtures containing entirely fatty acid may be desirable. An added feature of this technology is the ability to separate the glycerine produced upon hydrolysis to TAG from the fatty acid, and market the glycerine as a valuable coproduct.

BRIEF DESCRIPTION OF THE DRAWINGS

For a more detailed description of the preferred embodiment of the present invention, reference will now be made to the accompanying drawings, wherein:

FIG. 1 is a table presenting compositions of fatty acid mixtures converted to hydrocarbons.

FIG. 2 is a table presenting typical hydrocarbon distribution from processing of soy fatty acid.

FIG. 3 is a table presenting the distribution of products from dewatering, deacidification, and isomerization steps.

FIG. 4 is a table presenting the results from the first test matrix.

FIG. 5 is a table presenting the results from yellow grease as feedstock.

NOTATION AND NOMENCLATURE

The term "brown grease" comprises trap grease, sewage grease (e.g., from a sewage plant), and black grease. Brown grease from traps and sewage plants are typically unsuitable for use as animal feed. The term brown grease also encompasses other grease having a FFA content greater than 20% and being unsuitable for animal feed.

The term "yellow grease" comprises used frying oils from deep fryers and restaurant grease traps. It also encompasses lower-quality grades of tallow from rendering plants.

Fatty acids can be bound or attached to other molecules, such as in triglycerides or phospholipids. When they are not attached to other molecules, they are known as "free" fatty acids. The uncombined fatty acids or FFAs may come from the breakdown of a triglyceride into its components (fatty acids and glycerol). For example, a FFA may break off through hydrolysis, for example, steam from cooking foods, salts, chemicals, heat, etc. In the presence of a catalyst (e.g., acid), a FFA may combine with a methanol to produce a molecule of biodiesel. The FFA in crude vegetable oils ranges from about 1% to about 4% (olive oil may comprise up to about 20%). The amount of FFA in yellow grease (e.g., recycled cooking oil) generally ranges from about 4% to about 15%. Brown grease (e.g., trap grease) may comprise a FFA composition of about 50% to 100% of raw material.

Here the term "hydrotreatment" is used to refer to a catalytic process whereby oxygen is removed from organic compounds as water (hydrodeoxygenation); sulfur from organic sulfur compounds as dihydrogen sulfide (hydrodesulfurization); nitrogen from organic nitrogen compounds as ammonia (hydrodenitrogenation); and halogens, for example, chlorine from organic chloride compounds as hydrochloric acid (hydrodechlorination).

The term "normal alkanes" is used to refer to n-paraffins, or linear alkanes, that do not contain side chains.

DETAILED DESCRIPTION

I. Overview

In one example, this disclosure describes a method and process by which renewable feedstocks can be converted to gasoline, kerosene, jet fuels, and diesel fractions. According to some examples in this disclosure, TAG feedstocks are converted to a product comprising paraffinic hydrocarbons without the need for presulfiding of a hydrotreating catalyst or the requirement of the feedstock being doped with sulfur. In embodiments, TAG feedstocks are converted to a product comprising paraffinic hydrocarbons whereby the hydrocarbon chain length distribution is controlled to provide a distribution that is similar to petroleum-derived fuels. Control of the process may be achieved by allowing for simultaneous reduction, decarbonylation, and decarboxylation reactions. Key control parameters are the temperature, pressure, and the use of a nonsulfided hydrotreating catalyst. The nonsulfided hydrotreating catalyst allows for reduction, decarbonylation, and decarboxylation reactions to run simultaneously over a range of conditions. The results show (vide infra) that TAG feedstock can be converted to a paraffinic product at lower temperatures and pressures than those described previously. The paraffinic product may further undergo isomerization, cyclization, and/or aromatization steps to provide distinct blendstocks via distillation. When skillfully blended, these distinct blendstocks can become drop-in-compatible and fit-for-purpose gasoline, kerosene, jet fuels, or diesel fuels. These fuels have chemical compositions similar to the hydrocarbons and are fully fungible with petroleum-derived fuels. That is, the fuels produced may be identical in virtually all respects to commercially available petroleum-derived fuels.

According to some examples in this disclosure, a feedstock comprising TAG is hydrotreated (hydrodeoxygenated). The TAG may be obtained from terrestrial or marine sources. The TAG feedstock may comprise triacylglycerides derived from plants, triglycerides derived from animals, triglycerides derived from algae, or combinations thereof. The TAG feedstock may further comprise diacylglycerides, monoacylglycerides, FFAs, and/or FAME and combinations thereof as contaminants. The TAG feedstock may comprise yellow grease, brown grease, or a combination thereof. The TAG feedstock may comprise a blend of fresh TAG and used TAG (i.e., yellow grease and/or brown grease). According to some examples in this disclosure, the feedstock is not doped with sulfur. The ratio of the virgin and used TAG and/or the composition of the TAG feedstock may be selected such that hydrotreating produces a desired hydrocarbon product slate.

The TAG feedstock is hydrotreated using a hydrotreating catalyst that is not presulfided. In the hydrotreating, TAG, fatty acids, and fatty acid derivatives are deoxygenated, denitrogenated, and desulfurized. The hydrotreating catalyst may be any nonsulfided hydrotreating catalyst. In embodiments, the hydrotreating catalyst is a nonsulfided hydrogenation catalyst. The hydrotreating catalyst may contain one or more metals from Group VIII and VIB of the periodic table of the elements. The one or more metals may be selected from palladium (Pd), platinum (Pt), nickel (Ni), and combinations thereof. In embodiments, the catalyst is a NiMo catalyst comprising nickel and molybdenum. In some embodiments, the catalyst is a CoMo catalyst comprising cobalt and molybdenum. The hydrotreating catalyst may comprise supported or unsupported metals. In embodiments, the catalyst comprises a support. In applications, the support comprises alumina, silica, or a combination thereof. The catalyst may be a supported NiMo or CoMo catalyst. In embodiments, NiMo/$Al_2O_3$—$SiO_2$ or CoMo/$Al_2O_3$ catalyst is utilized.

Additionally, according to some examples in this disclosure, fatty acids are used as feedstocks in a thermocatalytic process whereby the fatty acid is reacted with hydrogen in the presence of a catalyst at a variety of temperature, pressure, and space velocity conditions. Under the conditions to be described, the fatty acid is converted to hydrocarbon. The first step is a mixture of hydrodeoxygenation (reduction), decarboxylation, and decarbonylation processes. Subsequent processing steps (i.e., isomerization and selective cracking) may convert the product of the first step to liquid transportation fuels. Fuels that can be produced include, but are not limited to, gasoline, naphtha, kerosene, jet, and diesel fuels.

The fatty acids are obtained by hydrolysis of TAGs. TAGs may be sourced from plants, animals, or microorganisms. Fatty acids suitable for use in this process may have acid values as high as 201 and saponification values as high as 203. Mixtures possessing both lower acid and saponification values are similarly processed to hydrocarbons via this method.

The compositions for two fatty acid mixtures that were processed to hydrocarbons are listed in Table 1.

Reactor temperature parameters can vary between 150° and 500° C., with most desired temperatures being in the range of 260° and 430° C. Reactor pressures may vary between 200 and 750 psi, with the most desired being in the range of 500 and 550 psi. Hydrogen flow rates may vary between 2.5 and 50 standard cubic feet per liter of TAG and/or fatty acids, with 15-20 standard cubic feet per liter of TAG and/or fatty acids being most preferred. Liquid hourly space velocities (LHSV) can vary between 1 and 4, with values between 0.8 and 1.2 being most preferred. The use of a nonsulfided catalyst allows for more efficient usage of hydrogen; therefore, less total hydrogen is supplied to the hydrodeoxygenation reactor than is required by technologies employing sulfided catalysts.

II. Product Comprising Predominantly Normal Alkanes

In some exemplary applications, a product comprising predominantly normal alkanes is produced. In such applications, the hydrotreating of the TAG feedstock is operated at modest temperatures and pressures (relative to referenced methods). In these embodiments, the temperature is in the range of about 340° to 410° C. In some embodiments, the temperature is in the range of about 390° to 410° C. In some embodiments, the temperature is about 400° C. Preferred pressures in such applications are in the range of about 100 to 200 psig. In some embodiments, the pressure is in the range of about 150 to about 200 psig. In embodiments, the temperature is about 400° C., and the pressure is about 200 psig. Suitable pressure is below that typically employed in processes utilizing sulfided hydrotreating catalysts.

The paraffinic hydrocarbon product produced in this manner may comprise predominantly normal alkanes. The product may comprise more than about 50% normal alkanes, more than 60% normal alkanes, more than 70% normal alkanes, or about 73% normal alkanes. The product may further comprise normal alkenes. The product may comprise about 10% normal alkenes. The paraffinic product may further comprise a trace of fatty acid, not more than 0.1% by weight. This outcome is achievable through the use of a nonsulfided hydrotreating catalyst, thus providing excellent conversion of TAG feedstock to paraffinic product. The paraffinic product is convertible to liquid transportation fuels by standard petroleum-refining and processing methods. For example, the paraffinic product may further undergo isomerization, cyclization, and/or aromatization steps to provide distinct blendstocks from which desired transportation fuels may be obtained.

Fatty acids were obtained from commercial sources, including very pure fatty acids marketed as products intended for a variety of uses, including cosmetics, as well as from waste recovery operations. The quality of the fatty acid to be used in the process can vary widely. The process is robust enough to accommodate fatty acids possessing varying types of impurities, including water. The minimum purity of the fatty acids utilized was 88%, although results indicate that the purity could be lower, with acceptable results being achieved. Blending of TAG with fatty acids followed by practice of the process is expected to provide hydrocarbons with acceptable quality for conversion to transportation fuels.

Additionally, FAME was obtained from a commercial source. The FAME was commercially labeled as B99 biodiesel. B99 is used in blending with petroleum-derived diesel fuel, providing a renewable component to generally accepted transportation fuel.

Fuels and fuel blendstocks that can be produced by this process include gasoline, kerosene, jet fuel, and diesel. Additionally, hydrocarbons produced by the process may be utilized for the production of chemicals, including those useful as feedstocks for the production of polymers, such as polyethylene and polypropylene.

This method converts fatty acids to a mixture of hydrocarbons. The method produces predominantly normal paraffins (~76%) and iso-paraffins (~15%) as well as small amounts of cycloparaffins (<1%), and olefins (~3%). A breakdown of the composition of the hydrocarbons produced from soy-derived fatty acid is detailed in Table 2.

Other products formed include water, carbon dioxide, and carbon monoxide. Other carbonaceous products are formed in minute quantities which do not adversely impact the conversion of this product to transportation fuel in subsequent processes and operations.

Analysis of the crude product mixture for fatty acids was performed. Trace amounts of fatty acid were detectable by sensitive analytical methods. The amount of fatty acid present in the hydrocarbon phase is best determined by an acid-base titration, with the results expressed as mg of potassium hydroxide (KOH) consumed per gram of hydrocarbon. Most often, this test provides results of less than 0.20 milligram KOH per gram of hydrocarbon.

The hydrocarbon products formed from fatty acids arise from a number of chemical reactions. These reactions may include, but are not limited to, reduction, decarboxylation, decarbonylation, cracking, isomerization, cyclization, dehydrogenation, and hydrogenation.

The processing of B99 FAME produced similar results.

When appropriately practiced, the method produces a mixture of hydrocarbons that can be conveniently transformed into a liquid transportation fuel by the following operations: dewatering and deacidification, isomerization, and distillation.

This method offers advantages over methods in that the very nature of the catalyst is different, thus potentially offering the ability to operate at lower temperatures and/or pressures while achieving the same or superior outcome as other methods. This may offer economic advantages in large-scale production settings.

III. Product Comprising Predominantly Iso-Alkanes

Conversion of the crude hydrocarbons detailed in Table 2 is accomplished utilizing the following methods: dewatering and deacidification, isomerization, and distillation. Dewatering and deacidification are accomplished in two steps. First, the hydrocarbon mixture is cooled to ambient temperature (20°-30° C.), and a phase separation is performed. Other temperatures may work equally well for this operation. Second, the hydrocarbon is passed through a bed of 4-Å molecular sieves to remove adventitious water.

Deacidification is accomplished simultaneously with dewatering, especially during the molecular sieve treatment step. This is because the molecular sieves possess activity of a base.

Isomerization is accomplished by passing the dried hydrocarbon over a bed of isomerization catalyst at a specified temperature, liquid flow rate, and hydrogen pressure that facilitates the conversion of normal paraffins to iso-paraffins. Such specifications are based on the activity of the catalyst. A typical product mixture from these operations is illustrated in Table 3.

Distillation of a mixture such as the one described in Table 3 can provide fuels useful in either spark ignition or compression ignition engines. Further, the blending of appropriate distillate fractions with appropriate petroleum-derived aromatic hydrocarbons and mixtures of aromatic hydrocarbons, when skillfully performed, can provide a renewable petroleum blend of hydrocarbons that complies with the U.S. military specification for jet fuel, MIL-DTL-83133F.

IV. Product Comprising Saturated and Aromatic Hydrocarbons

In another embodiment, higher pressures may be utilized in order to produce a product comprising aromatic hydrocarbons along with saturated hydrocarbons. The operating temperature for such embodiments may be in the range of about 470° to 530° C. In some embodiments, the temperature is in the range of about 480° to 500° C. In some embodiments, the temperature is about 480° C. The operating pressure may be in the range of about 650 to about 1000 psig. In some embodiments, the hydrotreating pressure may be in the range of about 700 to 800 psig. In some applications, the pressure is about 750 psig. In some applications, the temperature is about 480° C., and the pressure is about 750 psig.

In some embodiments, the TAG feedstock is converted to a product comprising predominantly saturated hydrocarbons and aromatic hydrocarbons. The saturated/aromatic hydrocarbon product produced in this manner may comprise predominantly saturated hydrocarbons. The product may comprise more than about 60% saturated hydrocarbons, more than about 70% saturated hydrocarbons, more than about 75% saturated hydrocarbons, or about 77% saturated hydrocarbons. The saturated/aromatic hydrocarbon product may comprise more than about 10% aromatic hydrocarbons, more than about 20% aromatic hydrocarbons, more than about 30% aromatic hydrocarbons, or about 17% aromatic hydrocarbons. In embodiments, the saturated/aromatic product further comprises alkene hydrocarbons. The product may comprise less than about 20% normal alkenes, less than about 10% normal alkenes, or less than about 3% normal alkenes.

The composition of the TAG feedstock may be selected such that the ratios of saturated hydrocarbons to aromatic hydrocarbons to olefinic hydrocarbons are ideally suited to the production of a desired fuel selected from gasoline, kerosene, jet fuels, and diesel fuels. For example, such a saturated/aromatic product may be useful in the production of jet fuel, with minimal secondary processing being required. Secondary processing may comprise standard petroleum-refining and processing methods. The amount of aromatic hydrocarbon in the saturated/aromatic product may also be modulated by adjusting the temperature. It should be noted that these conditions offer a direct and economical path for the production of liquid transportation fuels, especially jet fuel, which require minimal secondary processing.

IV. EXAMPLES

Examples 1-9

Coconut Oil

The apparatus for all experiments was a continuous-flow reactor comprising a pump system, gas flow system, high-pressure reactor vessel, reactor heater and temperature regulation device, product collection receptacle, and pressure regulation device. Appropriate instrumentation and electronics were attached to the whole device to enable control and recording of experimental conditions. Samples of product were removed through the sample receptacle and analyzed with appropriate analytical instrumentation (i.e., gas chromatography-mass spectrometry [GC-MS]). Hydrogen was supplied to the reactor system from purchased cylinders. TAG material was supplied to the reactor system via a high-pressure pumping system. In the first series of examples, 1.12 kg of a nonsulfided hydrotreating catalyst was charged to the reactor chamber. The chamber possessed a length-to-diameter ratio of 6. The catalyst was activated by warming to greater than 300° C. while a flow of hydrogen gas was passed over the catalyst. The moisture content of the exiting gas was measured. The activation was judged complete when the water content of the exiting gas decreased.

Example 1

Coconut oil was supplied to the reactor at a rate of 1 pound/hour. Hydrogen was supplied at a rate of 20 standard cubic feet per hour (scfh). The reactor was maintained at 340° C. The hydrogen pressure was regulated to 80 psi. The temperature and flow conditions were maintained for 3 hours once steady-state conditions were achieved. The product was collected and analyzed. Results are shown in Table 4.

Example 2

Coconut oil was supplied to the reactor at a rate of 1 pound/hour. Hydrogen was supplied at a rate of 20 scfh. The reactor was maintained at 350° C. The hydrogen pressure was regulated to 100 psi. The temperature and flow conditions were maintained for 3 hours once steady-state conditions were achieved. The product was collected and analyzed. Results are shown in Table 4.

Example 3

Coconut oil was supplied to the reactor at a rate of 2 pounds/hour. Hydrogen was supplied at a rate of 40 scfh. The reactor was maintained at 350° C. The hydrogen pressure was regulated to 100 psi. The temperature and flow conditions were maintained for 3 hours once steady-state conditions were achieved. The product was collected and analyzed. Results are shown in Table 4.

Example 4

Coconut oil was supplied to the reactor at a rate of 1 pound/hour. Hydrogen was supplied at a rate of 20 scfh. The reactor was maintained at 350° C. The hydrogen pressure was regulated to 200 psi. The temperature and flow conditions were maintained for 3 hours once steady-state conditions were achieved. The product was collected and analyzed. Results are shown in Table 4.

Example 5

Coconut oil was supplied to the reactor at a rate of 2 pounds/hour. Hydrogen was supplied at a rate of 40 scfh. The reactor was maintained at 350° C. The hydrogen pressure was regulated to 200 psi. The temperature and flow conditions were maintained for 3 hours once steady-state conditions were achieved. The product was collected and analyzed. Results are shown in Table 4.

Example 6

Coconut oil was supplied to the reactor at a rate of 1 pound/hour. Hydrogen was supplied at a rate of 20 scfh. The reactor was maintained at 400° C. The hydrogen pressure was regulated to 100 psi. The temperature and flow conditions were maintained for 3 hours once steady-state conditions were achieved. The product was collected and analyzed. Results are shown in Table 4.

Example 7

Coconut oil was supplied to the reactor at a rate of 2 pounds/hour. Hydrogen was supplied at a rate of 40 scfh. The reactor was maintained at 400° C. The hydrogen pressure was regulated to 100 psi. The temperature and flow conditions were maintained for 3 hours once steady-state conditions were achieved. The product was collected and analyzed. Results are shown in Table 4.

Example 8

Coconut oil was supplied to the reactor at a rate of 1 pound/hour. Hydrogen was supplied at a rate of 20 scfh. The reactor was maintained at 400° C. The hydrogen pressure was regulated to 200 psi. The temperature and flow conditions were maintained for 3 hours once steady-state conditions were achieved. The product was collected and analyzed. Results are shown in Table 4.

Example 9

Canola oil was supplied to the reactor at a rate of 1 pound/hour. Hydrogen was supplied at a rate of 50 scfh. The reactor was maintained at 400° C. The hydrogen pressure was regulated to 200 psi. The temperature and flow conditions were maintained for 3 hours once steady-state conditions were achieved. The product was collected and analyzed. Results are shown in Table 4.

Examples 10-17

Yellow Grease

For the second series of experiments, a smaller reactor system was utilized. The reactor tube possessed a length-to-diameter ratio of about 40. The tube was loaded with a total of about 70 grams of catalyst for the experiments listed below. The feedstock for this series of examples was waste TAG (yellow grease) obtained from a french fry factory. The yellow grease possessed a significant (2.6%) FFA content.

Example 10

Yellow grease was supplied to the reactor at a rate of 1 milliliter/minute (mL/min). Hydrogen was supplied at a rate of 1064 standard cubic centimeters/minute (sccm). The reactor was maintained at 474° C. The hydrogen pressure was regulated to 750 psi. The temperature and flow conditions were maintained for 30 minutes once steady-state conditions were achieved. The product was collected and analyzed. Results are shown in Table 5.

A mixture of hydrodeoxygenation, decarboxylation, and decarbonylation reactions occur simultaneously during the conversion of TAG to hydrocarbon product. The hydrodeoxygenation reactions provide a hydrocarbon product possessing even-numbered carbon chains, such as octadecane. The decarboxylation and decarbonylation reactions provide a hydrocarbon product possessing odd-numbered carbon chains such as heptadecane. The ratio of C17 to C18 product observed is 0.79 to 1. Coincident cracking reactions provide a mixture of lower normal hydrocarbons. The observed ratios of even- and odd-numbered hydrocarbon chains are C15:C16=0.57, C13:C14=1.22, C11:C12=1.15, C9:C10=1.11, and C7:C8=1.03.

The simultaneous production of both even and odd carbon chains of varying lengths serves to facilitate the ultimate production of a petroleumlike final fuel product (i.e., gasoline, kerosene, jet fuel, or diesel).

Example 11

Yellow grease was supplied to the reactor at a rate of 1 mL/min. Hydrogen was supplied at a rate of 1050 sccm. The reactor was maintained at 480° C. The hydrogen pressure was regulated to 750 psi. The temperature and flow conditions were maintained for 30 minutes once steady-state conditions were achieved. The product was collected and analyzed. Results are shown in Table 5.

Example 12

Yellow grease was supplied to the reactor at a rate of 1 mL/min. Hydrogen was supplied at a rate of 1050 sccm. The reactor was maintained at 490° C. The hydrogen pressure was regulated to 750 psi. The temperature and flow conditions were maintained for 30 minutes once steady-state conditions were achieved. The product was collected and analyzed. Results are shown in Table 5.

Example 13

Yellow grease was supplied to the reactor at a rate of 1 mL/min. Hydrogen was supplied at a rate of 1050 sccm. The reactor was maintained at 502° C. The hydrogen pressure was regulated to 750 psi. The temperature and flow conditions were maintained for 30 minutes once steady-state conditions were achieved. The product was collected and analyzed. Results are shown in Table 5.

Example 14

Yellow grease was supplied to the reactor at a rate of 1 mL/min. Hydrogen was supplied at a rate of 1050 sccm. The reactor was maintained at 530° C. The hydrogen pressure was regulated to 750 psi. The temperature and flow conditions were maintained for 30 minutes once steady-state conditions were achieved. The product was collected and analyzed. Results are shown in Table 5.

Example 15

Yellow grease was supplied to the reactor at a rate of 1.5 mL/min. Hydrogen was supplied at a rate of 1050 sccm. The reactor was maintained at 498° C. The hydrogen pressure was regulated to 750 psi. The temperature and flow conditions were maintained for 30 minutes once steady-state conditions were achieved. The product was collected and analyzed. Results are shown in Table 5.

Example 16

Yellow grease was supplied to the reactor at a rate of 4.5 mL/min. Hydrogen was supplied at a rate of 1066 sccm. The reactor was maintained at 482° C. The hydrogen pressure was regulated to 750 psi. The temperature and flow conditions were maintained for 30 minutes once steady-state conditions were achieved. The product was collected and analyzed. Results are shown in Table 5.

Example 17

Yellow grease was supplied to the reactor at a rate of 4.5 mL/min. Hydrogen was supplied at a rate of 1088 sccm. The reactor was maintained at 487° C. The hydrogen pressure was regulated to 750 psi. The temperature and flow conditions were maintained for 30 minutes once steady-state conditions were achieved. The product was collected and analyzed. Results are shown in Table 5.

Example 18

Product Fuels

Hydrocarbon product obtained from process conditions such as those described in Tables 4 and 5 was subjected to petroleum-refining operations, including isomerization, aromatization, hydrogenation, and distillation under conditions known to those skilled in the art, such that a fuel was produced that complied with the military specification for JP-8 (MIL-DTL-83133E). The fuel possessed a flash point of 49° C., a freeze point of −52° C., and an energy density of 42.9 MJ/kg. Furthermore, the fuel complied with all aspects of MIL-DTL-83133E, including physical density, distillation (D-86), etc.

The processing of TAG, either virgin or waste, according to the examples above, provides a fuel possessing properties consistent with drop-in compatibility and fit-for-purpose usage, according to either MIL-DTL-83133E or MIL-DTL-83133F.

Examples 19-21

The reactor system used for this process possessed a tubular reactor with internal dimensions of 1.5-inch diameter and 56-inch length. The reactor was heated to the desired operating temperature by means of heating elements affixed to the outside of the reactor tube. Liquid was supplied to the reactor by means of a high-pressure pump that drew fatty acid in the liquid state from a heated reservoir. The fatty acid was passed through a tubular preheater prior to introduction to the tubular reactor. Hydrogen was supplied from high-pressure cylinders, with the flow rate controlled by means of a mass flow controller. The pressure of the reactor system was controlled by means of a back-pressure controller located at the end of the reactor system. The end of the reactor system possessed a chiller and a pressure letdown system to aid in sample collection. Temperatures, pressures, and flow rates were controlled via PC-driven PID process control software.

Example 19

The reactor was charged with a nonsulfided hydrotreating catalyst (~1.5 kg). The catalyst bed was slowly warmed to the desired operating temperature while passing a steady flow of hydrogen over the catalyst bed. A hydrogen flow of 50 standard cubic feet per hour (scfh), liquid flow of 2 liters per hour (lph) of fatty acid, and a reactor pressure of 735 pounds per square inch (psi) were established. The temperature of the reactor was stabilized at 430° C. Fatty acids as described by Sample 1 in Table 1 were pumped through the reactor, with product being formed consistent with the composition described in Table 2. The recovered mass yield of liquid products was 95.8%. Analysis indicated that ~85.0% of the mass of fatty acid had been converted to hydrocarbon and ~10.8% converted to water, with the balance being converted to gaseous products.

Example 20

The reactor was charged with a nonsulfided hydrotreating catalyst (~1.5 kg). The catalyst bed was slowly warmed to the desired operating temperature while passing a steady flow of hydrogen over the catalyst bed. A hydrogen flow of 50 scfh, a liquid flow of 2 lph of fatty acid, and a reactor pressure of 530 psi were established. The reactor temperature was stabilized at 430° C. Fatty acid as described by Sample 2 in Table 1 was pumped through the reactor, with product being formed consistent with the composition described in Table 2. The recovered mass yield was ~97.1%. Analysis of the data indicated that ~86.8% of the fatty acid had been converted to hydrocarbons and ~10.3% converted to water, with the balance being converted to gaseous products.

Example 21

The reactor was charged with a catalyst possessing hydrocarbon isomerization activity. The catalyst was activated by slowly warming the catalyst to the desired operating temperature while passing a steady flow of hydrogen over the catalyst. The reactor was pressurized to the desired operating pressure, and the desired hydrogen flow rate was established. A flow of dewatered and deacidified product such as described in Table 2 was introduced to the reactor at an appropriate flow rate. If required, multiple passes through the isomerization catalyst bed were utilized to obtain a degree of isomerization suitable for the particular fuel product being sought. A portion of isomerized product possessing between 70% and 80% isomerization was subjected to distillation. In this manner, a distillate cut was produced that displayed a flash point of 43° C. and a freeze point of −49° C. A fuel with such properties is useful as a synthetic paraffinic kerosene (SPK) jet fuel. Additionally, blending such an SPK with appropriate petroleum-derived or coal derived aromatic compounds provides a fuel possessing a flash point of 44° C., a freeze point of −59° C., and a physical density of 0.789 kilograms per liter. A fuel with such properties is useful as JP-8, which is jet fuel that complies with all fuel property requirements described in U.S. Military Fuel Specification MIL-DTL-83133F.

While various embodiments of the invention have been shown and described, modifications thereof can be made by one skilled in the art without departing from the spirit and teachings of the disclosure. The embodiments described herein are exemplary only and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). Use of the term "optionally" with respect to any element of a claim is intended to mean that the subject element is required or, alternatively, is not required. Both alternatives are intended to be within the scope of the claim. Use of broader terms such as comprises, includes, having, etc., should be understood to provide support for narrower terms such as consisting of, consisting essentially of, comprised substantially of, etc.

Accordingly, the scope of protection is not limited by the description set out above but is only limited by the claims that follow, that scope including all equivalents of the subject matter of the claims. Each and every claim is incorporated into the specification as an embodiment of the present invention. Thus the claims are a further description and are an addition to the preferred embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent they provide exemplary, procedural, or other details supplementary to those set forth herein.

What is claimed is:

1. A method of producing a hydrocarbon product, the method comprising:
hydrotreating a feedstock comprising triacylglyceride (TAG) and at least one of fatty acids and fatty acid methyl ester (FAME) in the presence of a nonsulfided hydrotreating catalyst to produce a first product comprising hydrocarbons, wherein hydrotreating is performed at a temperature in the range of about 470° to about 530° C. and a pressure in the range of about 750 to about 1000 psig.

2. The method of claim 1 wherein the feedstock comprising TAG is derived from at least one of plants, animals, algae, other microorganisms, or combinations thereof.

3. The method of claim 2 further comprising selecting a feedstock comprising at least one of virgin TAG, used TAG, and a combination of virgin TAG and used TAG.

4. The method of claim 2, further comprising selecting a feedstock comprising at least one of virgin TAG, used TAG, and free fatty acid.

5. The method of claim 1 wherein the feedstock comprising fatty acids is selected from the group consisting of free fatty acids derived by hydrolysis of TAG.

6. The method of claim 1 wherein the feedstock comprising fatty acids is selected from the group consisting of FAMEs derived from TAG.

7. The method of claim 1 wherein hydrotreating provides a first product possessing both even- and odd-numbered carbon chains.

8. The method of claim 7 wherein hydrotreating comprises reduction, decarboxylation, and decarbonylation reactions.

9. The method of claim 1 wherein the nonsulfided hydrotreating catalyst comprises at least one metal selected from Groups VIII and VIB of the periodic table.

10. The method of claim 9 wherein the hydrotreating catalyst comprises at least one metal selected from the group consisting of palladium (Pd), platinum (Pt), nickel (Ni), and combinations thereof.

11. The method of claim 9 wherein the hydrotreating catalyst further comprises a support selected from alumina, silica, and combinations thereof.

12. The method of claim 1 wherein the hydrotreating catalyst comprises nickel and molybdenum or cobalt and molybdenum.

13. The method of claim 1 wherein the feedstock is not doped with sulfur prior to hydrotreating.

14. The method of claim 1 further comprising subjecting the first product to at least one process selected from isomerization, cyclization, and aromatization to produce a second product compliant with the specification for gasoline, kerosene, jet fuels, and diesel fuels.

15. The method of claim 14 wherein the second product is blended with petroleum-derived fuels and/or solvents to produce a specification-compliant fuel.

16. The method of claim 14 wherein the second product is blended with coal-derived fuels and/or solvents to produce a specification-compliant fuel.

17. The method of claim 1 wherein the first product comprises primarily saturated and aromatic hydrocarbons.

18. The method of claim 17 wherein the first product is suitable as a liquid transportation fuel with minimal or no secondary petroleum-refining and processing operations.

19. The method of claim 17 wherein the first product further comprises olefinic hydrocarbons, and wherein the ratio of the saturated hydrocarbons to the aromatic hydrocarbons to the olefinic hydrocarbons in the first product may be varied so as to produce feedstocks ideally suited for the production of at least one fuel selected from gasoline, kerosene, jet fuel, and diesel fuels.

20. A method of producing a transportation fuel, the method comprising:
    selecting an undoped feedstock comprising at least one of virgin TAG, used TAG, or a combination thereof;
    hydrotreating the undoped feedstock in the presence of an unsulfided hydrotreating catalyst to produce a first product, wherein hydrotreating is performed at a temperature in the range of about 470° to about 530° C.; and
    subjecting the first product to at least one process selected from aromatization, cyclization, and isomerization, to produce a second hydrocarbon product selected from gasoline, kerosene, jet fuel, and diesel fuels.

21. The method of claim 20 wherein the first product comprises aromatic, saturated, and olefinic hydrocarbons and wherein the composition of the feedstock is selected such that the ratio of saturated to aromatic to olefinic hydrocarbons in the first product is suitable for the production of the second hydrocarbon product.

22. The method of claim 20 wherein the hydrotreating is performed in the absence of sulfur injection into the process or the feedstock.

23. The method of claim 20 wherein hydrotreating is performed at pressure in the range of about 750 to about 1000 psig.

* * * * *

UNITED STATES PATENT AND TRADEMARK OFFICE
CERTIFICATE OF CORRECTION

| | | |
|---|---|---|
| PATENT NO. | : 8,247,632 B2 | Page 1 of 1 |
| APPLICATION NO. | : 12/493193 | |
| DATED | : August 21, 2012 | |
| INVENTOR(S) | : Strege et al. | |

It is certified that error appears in the above-identified patent and that said Letters Patent is hereby corrected as shown below:

On the title page, in column 2, under "Other Publications" line 1, after "(2007)", insert --;--, therefor Signed and Sealed this
Second Day of December, 2014

Michelle K. Lee
*Deputy Director of the United States Patent and Trademark Office*